United States Patent [19]

Minchak

[11] 4,426,502
[45] Jan. 17, 1984

[54] BULK POLYMERIZATION OF CYCLOOLEFINS

[75] Inventor: Robert J. Minchak, Parma Heights, Ohio

[73] Assignee: The B. F. Goodrich Company, Akron, Ohio

[21] Appl. No.: 387,920

[22] Filed: Jun. 14, 1982

[51] Int. Cl.³ .............................................. C08F 4/06
[52] U.S. Cl. .................................... 526/172; 526/281
[58] Field of Search ............................... 526/172, 281

[56] References Cited

U.S. PATENT DOCUMENTS 3,432,445  3/1969  Minchak et al. ................. 526/172
3,790,544  2/1974  Maertens et al. ................. 526/172
4,069,376  1/1978  Minchak .......................... 526/280
4,239,874  12/1980  Ofstead et al. ................... 526/143

Primary Examiner—Joseph L. Schofer
Assistant Examiner—Peter F. Kulkosky
Attorney, Agent, or Firm—George A. Kap

[57] ABSTRACT

A process for bulk polymerizing a norbornene-type monomer, or a mixture thereof, that includes the steps of mixing the monomer with an organoammonium molybdate or tungstate catalyst and an alkoxyalkyl aluminum halide cocatalyst at a temperature at which polymerization of the monomer remains essentially dormant for at least one hour, and conveying the resulting mixture to a mold maintained at a temperature at which polymerization of the monomer takes place in less than about 2 minutes.

12 Claims, 2 Drawing Figures

BULK POLYMERIZATION OF CYCLOOLEFINS

BACKGROUND OF THE INVENTION

Polymers of cyclic olefins that contain the norbornene moiety can be made by ring-opening polymerization of the cyclic olefins in the presence of a metathesis catalyst comprising at least one alkylaluminum halide cocatalyst and at least one tungsten or molybdenum compound catalyst. Polymerization is accomplished by mixing a monomeric cyclic olefin, or a mixture thereof with or without other copolymerizable monomers, with a hydrocarbon solvent. A molecular weight modifier, selected from nonconjugated acyclic olefins, is then added to the reactor followed by an alkylaluminum halide cocatalyst and a tungsten or molybdenum compound catalyst. The solution polymerization reaction is conducted at 0° to 200° C., preferably 25° to 100° C., with stirring and is mildly exothermic. Polymerization time is on the order of less than 2 hours. The reaction mixture recovered directly from the reactor is a smooth, viscous polymer cement of honey-like consistency that comprises a polymer dissolved in the solvent.

Bulk polymerization is defined as polymerization in the absence of a solvent or a diluent. Early attempts of bulk polymerizations of the cyclic olefins using the metathesis catalyst system ended in failure because polymerization reactions were too rapid and therefore, uncontrollable. Furthermore, our initial bulk polymerization attempts resulted in materials that were very dark, had poor physical properties and poor appearance.

Our further developments in the bulk polymerization of cycloolefins led to another approach, which, likewise, was unsuccessful. This approach was characterized by splitting the monomer charge into two equal portions, one containing the catalyst and the other containing the cocatalyst. The object here was to mix the two portions of the monomer charge at room temperature and then transfer the mix to a heated mold where polymerization and hardening would occur very quickly. It was discovered that instantaneous reaction took place upon contact of the two portions whereby a solid polymer barrier was formed between the two portions of the monomer charge, encapsulating some of the monomer from each portion, indicating uncontrollable polymerization which prevented mixing.

This invention, therefore, relates to ring opening polymerization in bulk of at least one monomer containing the norbornene group or a mixture of such monomers or one or more of such monomers using a metathesis catalyst wherein an alkylaluminum halide cocatalyst is first transformed to at least one alkylalkoxyaluminum halide by reaction with at least one alcohol or active hydroxyl-containing compound but prior to subsequent contact (i.e., reaction) with at least one tungsten or molybdenum compound. The cyclic olefins can be formed into hard objects in a single step by means of a reaction injection molding (RIM) process. Examples of such objects are business machine housings, furniture, window frames, and the like.

The literature on solution ring opening polymerization of cycloolefins teaches the pre-contacting of at least one tungsten chloride catalyst with an alcohol or hindered hydroxybenzene for enhancement of polymerization efficiency, for increasing transition metal solubility, and for control of polymer microstructure (note U.S. Pat. Nos. 3,943,116 and 4,038,471) but specifically avoids pre-contacting the alcohol with alkylaluminum halide cocatalyst (note U.S. Pat. No. 4,239,874). Pre-reaction of the tungsten chloride with alcohol would allow for the formation of $(RO)_{\overline{n}}W$, W=O or W-O-W bonds, and hydrogen chloride leaving the organoaluminum compound as a strong reducing agent for the transition metal with essentially no formation of alkoxyalkylaluminum halides. Excess amount of alcohol can be added to these systems at end of polymerization to destroy the polymerization catalyst and to coagulate the polymer.

Our discovery of prereacting alcohols and/or other active hydroxyl-containing compounds with organoaluminum compounds to retard polymerization at room temperature long enough to mix together the catalyst components, fibers, fillers and other additives and to pump the mixture into a mold, was completely unexpected and undisclosed. In fact, only very specific ratios of alkoxyl, alkyl and halide groups on the aluminum provide the conditions for stability at room temperature and rapid polymerization at elevated temperature.

SUMMARY OF THE INVENTION

Ring opening polymerization of cyclic olefins containing the norbornene group is carried out in bulk in presence of at least one tungsten or molybdenum compound catalyst and at least one alkoxyalkylaluminum halide or aryloxyalkylaluminum halide cocatalyst. Another feature of this invention resides in polymerizing the cyclic olefins by a reaction injection molding (RIM) process whereby a cyclic monomer is introduced into a mold where it is polymerized and formed into a hard object in a single step at an elevated temperature in a period of less than about 2 minutes.

DETAILED DESCRIPTION OF THE INVENTION

Figure 1:
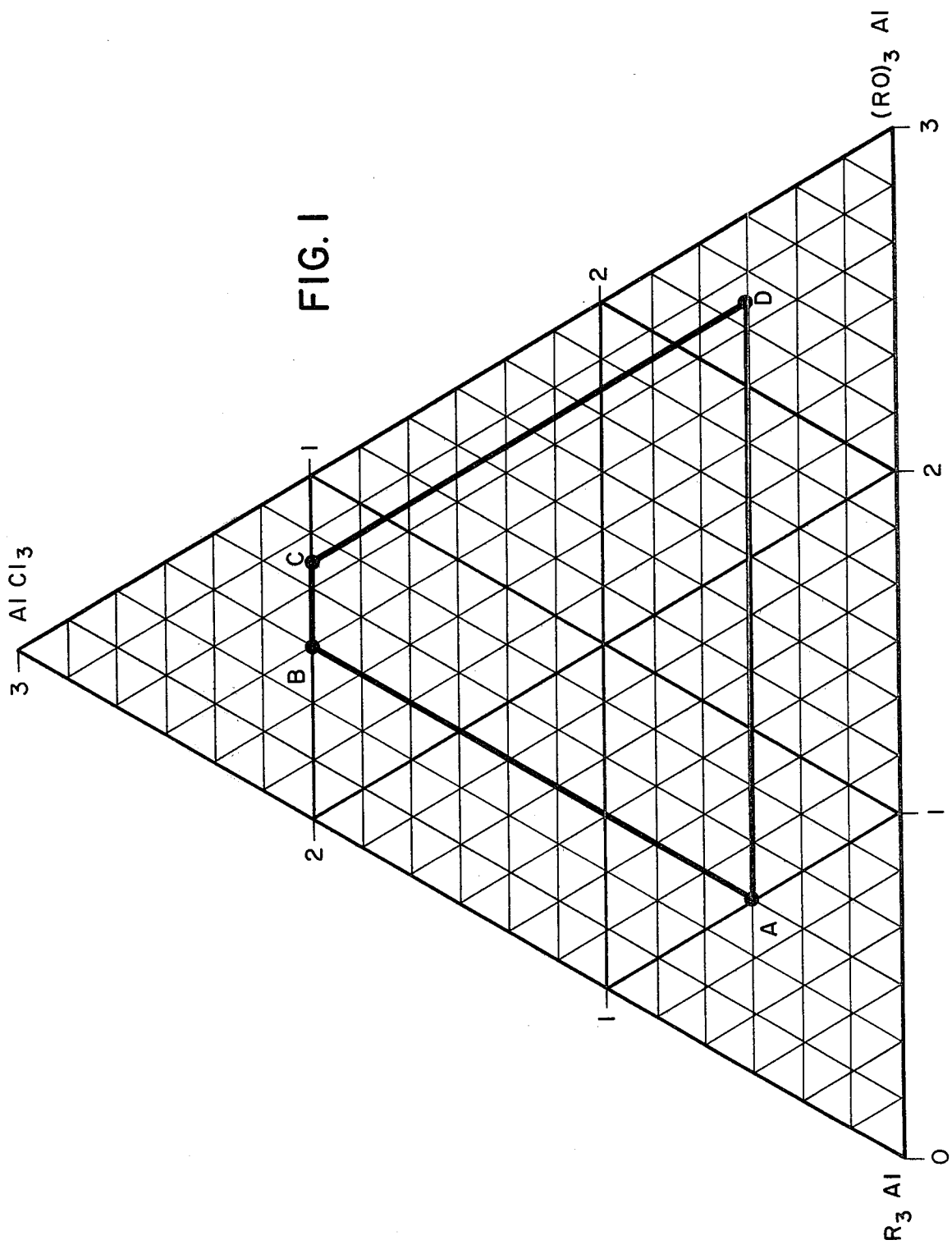
FIG. 1 is a triangular diagram of trialkylaluminum ($R_3Al$), aluminum trichloride ($AlCl_3$), and trialkoxyaluminum ($RO)_3Al$ showing an area A, B, C and D that generally defines the operable alkoxyalkylaluminum halide and aryloxyalkylaluminum halide cocatalyst that is used in conjunction with a tungsten or a molybdenum compound catalyst to polymerize in bulk at least one cyclic olefin monomer containing the norbornene group.

As was already described, the combination of tungsten or molybdenum compound catalyst with an alkylaluminum halide cocatalyst is too active for polymerizing a cycloolefin in bulk even at room temperature. Additional time is required to permit mixing of the catalyst system components, and other ingredients, before rapid reaction or polymerization takes place in the mold.

It is, therefore, desirable to modify the catalyst system in such a way as to provide an adequate induction period at ambient conditions and rapid thermally activated polymerization in the mold. Pot life, as used herein, refers to the time during which polymerization of the reaction mix at ambient conditions remains essentially dormant, the reactive mix being a mixture of at least one cyclic monomer, catalyst, and cocatalyst. Stated differently, pot life is the time interval between mixing of the ingredients to form the reactive mix and commencement of monomer polymerization at ambient conditions. Pot life depends on many variables such as the amount and type of ingredients, the temperature at which the reactive mix is held, impurities present in the system, ratio of catalyst to cocatalyst and other catalyst variables, etc. Pot life also depends on the reducing power of the cocatalyst, the higher the reducing power the shorter the pot life. It is believed that the cocatalyst compositions defined in area A, B, C and D in FIG. 1 have just the right reducing power so as not to reduce the catalyst activity at room temperature for one to eight hours, but to rapidly reduce the catalyst activity at temperatures between about 60° to 200° C.

Impingement mixing apparatus can be used to mix the ingredients herein, although this invention is not limited to the use of such mixing means. Reaction injection molding industry uses the impingement mixing apparatus nearly exclusively due to the requirements for very short pot lives of the urethane systems. These systems, however, cannot accommodate the use of large amounts of long fibers as mechanical reinforcement. With an impingement mixing apparatus, as applied to the system herein, the two monomer portions, one containing the catalyst and the other the cocatalyst, can be nearly instantaneously mixed and injected into the mold.

In order to mold formulations containing large amounts of long fibers as reinforcement, different mixing equipment must be used. In this type of mixing equipment, where the two monomer portions are separately introduced into a chamber provided with an agitation means, mixing time is longer and can vary from about 5 seconds to about one-half hour, but is preferably less than about 1 minute, depending on the shot or stroke size of the reactive mix and many other variables.

Since emergencies and work interruptions take place during molding operations, it is desirable to have a pot life much longer than it takes to merely mix the ingredients. For instance, a lunch break may be one-half to one hour long during which time, the reactive mix should remain essentially unreacted or unpolymerized otherwise, expensive time consuming solvent flushing of reactive mix from the mixing chamber would be required during lunch breaks. For these and other reasons, a short pot life is a disadvantage due to the fact that not enough time is given to work with the reactive mix since polymerization sets in too quickly.

Based on the considerations discussed above, the system herein can be designed to give a pot life of at least about one-half minute at room temperature. In a preferred embodiment, the pot life is about 1 hour to about 8 hours.

Polymerization or cure time is interrelated with pot life. Generally, with respect to the system herein, the longer the pot life the longer it will take to complete polymerization at an elevated temperature. For instance, if a pot life of about one-half hour were designed for the system described herein, polymerization can be completed in as short a time as about one-half minute for a mold temperature of about 110° C.; however, for a pot life of about 8 hours, polymerization may take a couple of minutes using similar mold temperatures. Furthermore, reaction or polymerization temperature will also depend on the pot life, as well as many other variables such as part thickness. Polymerization time can be reduced by raising the mold temperature, however, mold temperature should be kept below about 200° C.

The temperature of the mold for the system described herein should be in excess of 50° C., more likely in the range of about 60° to 200° C., preferably 90° to 130° C. Polymerization time for reaction injection molding should be less than about 5 minutes, preferably less than about 2 minutes. For other forms of bulk polymerization, different polymerization periods can be designed with a concomitant effect on pot life.

It has been discovered that by lowering the reducing power of the alkylaluminum halide cocatalyst, adequate pot life can be provided for mixing the various ingredients at room temperature and for work interruptions before initiation of the polymerization reaction takes place and subsequent rapid polymerization. Modification of the alkylaluminum halide cocatalyst is achieved by introducing an alkoxy group therein. This can be achieved either with oxygen, an alcohol, a phenol, and in other ways. When using an alcohol, such as ethanol and propanol, the alcohol can be prereacted with the cocatalyst before adding it to the system. Suitable alcohol is one which yields an alkoxy alkylaluminum halide cocatalyst that is soluble in the cycloolefin monomer. Such a reaction is conducted in absence of water by providing a blanket of nitrogen and mixing the two ingredients. The reaction is rapid and results in evolution of volatile hydrocarbons, such as ethane if diethylaluminum chloride is the cocatalyst. The reaction goes essentially to 100% completion.

Instead of prereacting the alcohol with the cocatalyst, the alcohol and the cocatalyst can be reacted in situ. The alkoxy groups are provided by the alcohols, of course, however, alkoxy or aryloxy groups can be supplied by other hydroxyl containing materials that come in contact with the cocatalyst before or during polymerization. For instance, any ingredient in the formulation that contains hydroxyl groups can provide such groups for reaction with the cocatalyst to inhibit its reducing potency. Examples of such materials are certain fillers and phenolic stabilizers that have available active hydroxyl groups for reaction with the cocatalyst. In such a case, when a suitable hydroxyl-containing filler is mixed with the ingredients of a formulation, including the cocatalyst, the hydroxyl groups on the filler react with the cocatalyst whereby an alkoxy or aryloxy group becomes attached to aluminum. Hindered phenols do not form phenoxyaluminum groups and are relatively inert in this chemistry. The alkoxy group in the cocatalyst functions to inhibit reducing power of the cocatalyst by replacing some of the alkyl groups on the aluminum thus making it possible to react the cyclic olefins via bulk polymerization. It should be understood that a stoichiometric excess of alcohol or a hydroxyl containing material must be avoided. Stoichiometric excess herein is defined as a molar amount of alcohol or hydroxyl containing material in excess of the molar amount of the alkylaluminum moiety, which renders the aluminum compound ineffective as a reducing agent or cocatalyst. In fact, the preferred ratio of alkoxyl or aryloxy groups to aluminum is defined by the area ABCD in FIG. 1.

The alkoxyalkylaluminum or aryloxyalkylaluminum halide obtained has the formula $(RO)_a R^1{}_b AlX_c$ where R is an alkyl or a phenyl radical containing about 1 to 18 carbon atoms, preferably 2 to 4; $R^1$ is an alkyl radical containing 1 to 18 carbon atoms, preferably 2 to 4; X is a halogen selected from chlorine, iodine, bromine and fluorine, preferably chlorine and iodine; "a" is the number of equivalents of the alkoxy or aryloxy moiety (RO−) and can vary from a minimum of about ½ to a maximum of about 2½, preferably from about 1 to about 1¾; "b" is the number of equivalents of the alkyl group ($R^1$) and can vary from a minimum of about ¼ to a maximum of about 2, preferably from about ½ to about 1; and "c" is the number of equivalents of halogen X and can vary from a minimum of about ½ to a maximum of about 2, preferably from about ¾ to about 1¼. The sum of a, b, and c must equal 3.0.

Also suitable as cocatalysts herein are the aryloxyalkylaluminum halides, as noted above. The aryloxy group is preferably derived from unhindered phenols and substituted and unsubstituted resorcinols. Especially preferred aryloxy group is the phenoxy group derived from a phenol that is unhindered at 2 and 6 positions. Specific examples of such compounds are phenol itself and derivatives of unsubstituted resorcinol where one of the two hydroxyl groups is esterified, as to a benzoate. These cocatalysts generally function as the alkoxyalkylaluminum halide cocatalysts.

The operable range for the alkoxyalkylaluminum and aryloxyalkylaluminum halide cocatalyst is defined by the area enclosed by lines ABCD in the plot of FIG. 1. Points A, B, C and D are defined as follows:

|     | A   | B   | C   | D   |
|-----|-----|-----|-----|-----|
| RO  | ½   | ½   | ¾   | 2¼  |
| Cl  | ½   | 2   | 2   | ½   |
| $R^1$ | 2 | ½   | ¼   | ¼   |

In all of the cocatalysts defined by the operable range ABCD, one atom of aluminum is combined with the indicated equivalents of the other moieties.

It has been discovered that the cocatalyst, to be useful in a bulk polymerization system described herein, must contain at least some halogen X, some alkoxy or aryloxy group RO, and some alkyl group R', along with aluminum. When the cocatalyst in the system is a trialkylaluminum ($R'_3Al$), the polymerization product is a viscous cement and conversion of only up to about 30% is achieved even at temperature as high as 140° C. With aluminum trihalide ($AlCl_3$) or trialkoxyaluminum (($RO)_3Al$) as cocatalysts in the system, very little or no polymerization takes place. Same is true of dialkoxyaluminum halide, since it does not contain the alkyl group.

Suitable catalysts are organoammonium molybdates and tungstates that are selected from those defined as follows:

$$[R_4N]_{(2y-6x)}M_xO_y \; [R^1{}_3NH]_{(2y-6x)}M_xO_y$$

where O represents oxygen; M represents either molybdenum or tungsten; x and y represent the number of M and O atoms in the molecule based on the valence of +6 for molybdenum, +6 for tungsten, and −2 for oxygen; and the R and $R^1$ radicals can be same or different and are selected from hydrogen, alkyl, and alkylene groups each containing from 1 to 20 carbon atoms, and cycloaliphatic groups each containing from 5 to 16 carbon atoms. All of the R and $R^1$ radicals cannot be hydrogens nor be small in the number of carbon atoms since such a condition will render the molecule essentially insoluble in hydrocarbons and most organic solvents. In a preferred embodiment, the R radicals are selected from alkyl groups each containing 1 to 18 carbon atoms wherein the sum of carbon atoms on all the R radicals is from 20 to 72, more preferably from 25 to 48. In a preferred embodiment, the $R^1$ radicals are selected from alkyl groups each containing from 1 to 18 carbon atoms wherein the sum of carbon atoms on all of the $R^1$ radicals is from 15 to 54, more preferably from 21 to 42.

It has been found that in the case of the organoammonium molybdates and tungstates represented by the formula $$[R_4N]_{(2y-6x)}M_xO_y$$

where all R radicals are the same, each can contain from 4 to 18 carbon atoms. Where three R radicals are the same, each containing from 7 to 18 carbon atoms, the remaining R can contain from 1 to 18 carbon atoms. Where three R radicals are the same, each containing 4 to 6 carbon atoms, the remaining R radical can contain 4 to 18 carbon atoms. In the case where two of the four R radicals are the same, the two same R radicals can each contain from 12 to 18 carbon atoms and the remaining two R radicals can contain from 1 to 18 carbon atoms. With respect to each other, the remaining two R radicals can be same or different as long as each contains 1 to 18 carbon atoms. Where all R radicals are different, the sum thereof can be in the range of 20 to 72 carbon atoms.

Similar remarks apply to organoammonium molybdates and tungstates that are defined by the following formulas:

$$[R^1{}_3NH]_{(2y-6x)}M_xO_y$$

The $R^1$ radicals cannot be too small if the molecule is to be soluble in a hydrocarbon reaction solvent and/or a norbornene-type monomer. Where all $R^1$ radicals are the same in the above formula, each can contain from 5 to 18 carbon atoms. Where two $R^1$ radicals are the same or all the $R^1$ radicals are different, each can contain from 1 to 18 carbon atoms and the sum thereof can be in the range of 15 to 72 carbon atoms. Included herein are also compounds wherein one $R^1$ radical is hydrogen in which case, the remaining two $R^1$ radicals can each contain 12 carbon atoms and greater, i.e., 12 to 18 carbon atoms.

Specific examples of suitable organoammonium molybdates and tungstates described herein include tridodecylammonium molybdates and tungstates, methyltricaprylammonium molybdates and tungstates, tri(tridecyl) ammonium molybdates and tungstates, and trioctylammonium molybdates and tungstates.

The organoammonium molybdate or tungstate or a mixture thereof, is employed at a level of about 0.01 to 50 millimoles molybdenum or tungsten per mole of total monomer, preferably 0.1 to 10 millimoles. The molar ratio of the alkylaluminum halide to the organoammonium molybdate and/or tungstate is not critical and can be in the range of about 200:1 or more to 1:10, preferably from 10:1 to 2:1 of aluminum to molybdenum or tungsten.

The norbornene-type monomers or cycloolefins that can be polymerized in bulk, in accordance with the process described herein, are characterized by the presence of at least one of the following norbornene group, identified by formula I, that can be substituted or unsubstituted:

(I)

Pursuant to this definition, suitable norbornene-type monomers include substituted and unsubstituted norbornenes, dicyclopentadienes, dihydrodicyclopentadienes, trimers of tricyclopentadiene, and tetracyclododecenes. Preferred monomers of the norbornene-type are those defined by the following formulas II and III:

(II)

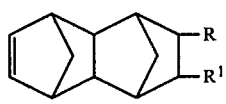
(III)

where R and R¹ are independently selected from hydrogen, alkyl, and aryl groups of 1 to 20 carbon atoms, and saturated and unsaturated cyclic groups containing 3 to 12 carbon atoms formed by R and R¹ together with the two ring carbon atoms connected thereto. In a preferred embodiment, R and R¹ are independently selected from hydrogen and alkyl groups of 1 to 2 carbon atoms. Examples of monomers referred to herein include dicyclopentadiene, methyltetracyclododecene, 2-norbornene and other norbornene monomers such as 5-methyl-2-norbornene, 5,6-dimethyl-2-norbornene, 5-ethyl-2-norbornene, 5-butyl-2-norbornene, 5-hexyl-2-norbornene, 5-octyl-2-norbornene, and 5-dodecyl-2-norbornene.

This invention especially contemplates preparation of homopolymers, copolymers and terpolymers of methylnorbornene, methyltetracyclododecene and dicyclopentadiene and especially homopolymers of methyltetracyclododecene and copolymers of methyltetracyclododecene and methylnorbornene. The copolymers of methyltetracyclododecene and methylnorbornene are polymerized from monomer mixtures containing from 1 to 75% by weight methylnorbornene and the copolymers contain from 1 to 75% by weight of polymerized methylnorbornene. The terpolymers are polymerized from monomer mixtures containing 1 to 75% by weight methylnorbornene and 25 to 99% by weight methyltetracyclododecene, with the remainder being dicyclopentadiene. The terpolymers contain from 1 to 75% by weight of polymerized methylnorbornene and 25 to 99% by weight polymerized methyltetrocyclododecene.

The monomer or mixture of norbornene-type monomers can contain up to about 20% by weight thereof of at least one other polymerizable monomer. Such other polymerizable monomers are preferably selected from mono- and dicycloolefins containing 4 to 12 carbon atoms, preferably 4 to 8 carbon atoms, examples of which include cyclobutene, cyclopentene, cyclopentadiene, cycloheptene, cyclooctene, 1,5-cyclooctadiene, cyclodecene, cyclododecene, cyclododecadiene, and cyclododecatriene. Also suitable are bicyclic olefins containing 7 to 16 carbon atoms and 1 to 4 double bonds, preferably 8 to 12 carbon atoms and 2 to 3 double bonds, such as norbornadiene.

At least one nonconjugated acyclic olefin can be used as a molecular weight modifier having at least one hydrogen on each double-bonded carbon atom and containing 2 to 12 carbon atoms, more preferably 3 to 8 carbon atoms. Preferably, the nonconjugated acyclic olefin is selected from 1-olefins and 2-olefins containing 3 to 8 carbon atoms such as 1-butene, 3-methyl-1-butene, 2-pentene, 4-methyl-2-pentene, and the like. Compounds not having hydrogen atoms substituted on double-bonded carbons are unreactive in this invention.

The nonconjugated acyclic olefin can be used in a molar ratio to total monomer charge of from about 0.0001 to about 1 mole per mole of the monomer charge. The nonconjugated acyclic olefin is charged directly with the monomers.

Figure 2:
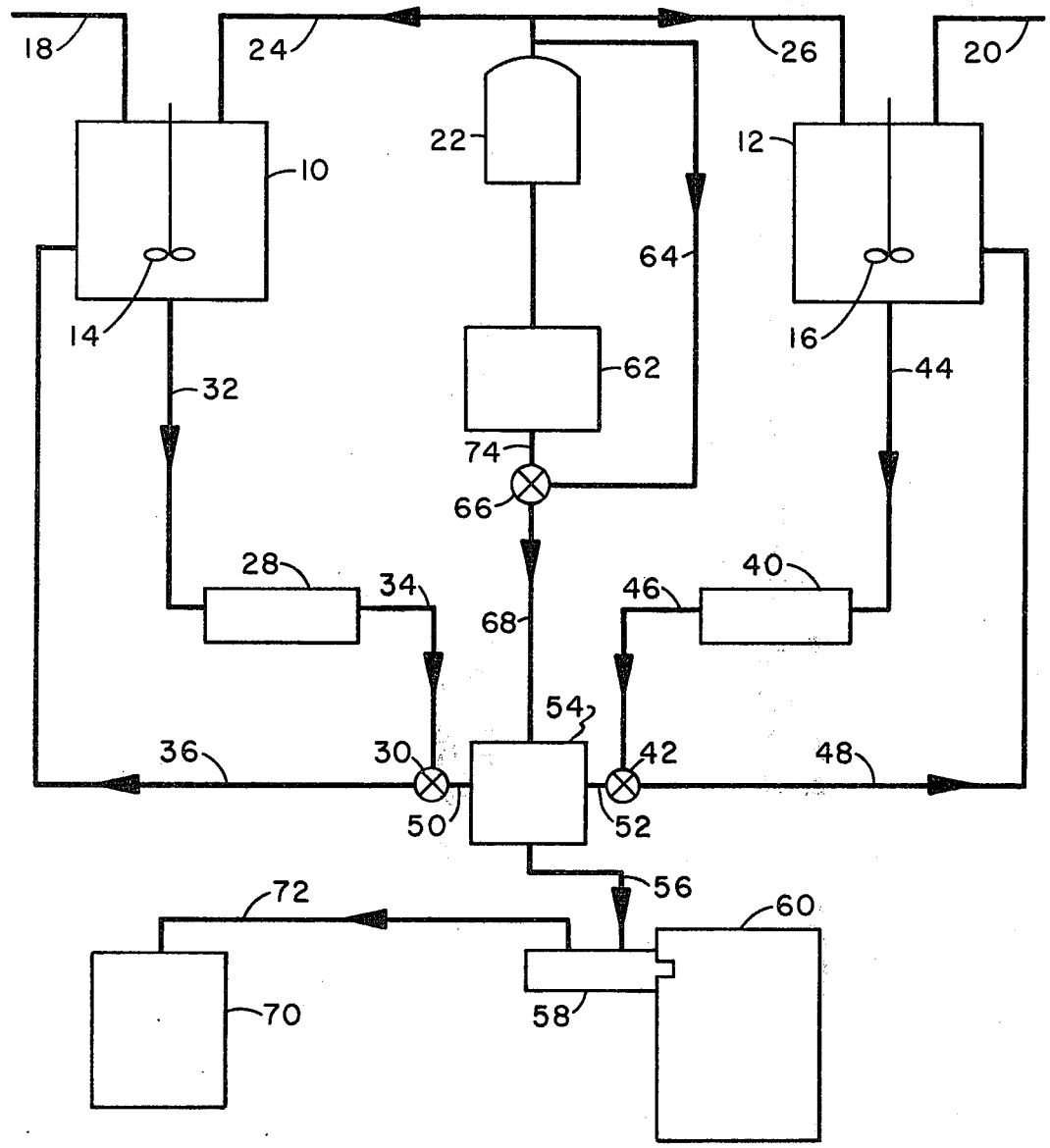
FIG. 2 is a flow diagram of a typical reaction injection molding process where a portion of cycloolefin is combined with a catalyst in one tank, another portion of the cycloolefin is combined with a cocatalyst in another tank, the two portions of the cycloolefins are mixed at ambient temperature and then are introduced into a preheated mold where polymerization is thermally initiated and is completed in a short period of time, following which, a hard, molded plastic item is removed from the mold.

Bulk polymerization of the system described herein is especially suitable for a reaction injection molding process, such as the one illustrated in FIG. 2. Referring to FIG. 2, one half of a cycloolefin is added to tank 10, together with a cocatalyst, and the other half is added to tank 12, along with a catalyst. Both the cocatalyst and the catalyst described herein are soluble in the cycloolefin monomers. Other additives can be admixed with the monomer in either or both tanks. Agitators 14, 16 are provided in the tanks to facilitate mixing of the monomer charges and each tank is connected to a vacuum source through respective lines 18, 20 so that each tank can be maintained under a blanket of nitrogen, the nitrogen being supplied from tank 22 through lines 24, 26. Contents of tank 10 can be continuously recirculated by means of pump 28 and valve 30 through lines 32, 34, and 36. Same thing can be done on the other side with the contents of tank 12 that are recirculated by means of pump 40 and valve 42 through lines 44, 46, and 48.

During molding operation, valves 30 and 42 are manipulated to admit monomer charges from tanks 10 and 12 through lines 50, 52 into mix head 54 where the monomer charges are mixed at about room or ambient temperature and conveyed via line 56 and clean-out piston 58 to mold 60. Since this is a thermally initiated system, the mold is maintained at a temperature in excess of about 50° C., preferably in the range of 60° to 200° C. and more preferably at about 90° to 130° C. The mold is described more specifically in the examples. It takes about one-quarter to one-half minute to fill the mold during which time, the mold temperature, assuming 120° C., drops from 120° C. to about 60° C. It should be understood that the piston and the cylinder therefor can be designed so that one stroke of the piston will fill the mold, although, more than one stroke can be used to fill the mold.

In the next interval of time of about one-quarter to one-half minute after the mold is filled, the temperature of the mix rises from about 60° C. to about 80° C. and then to about 230° C. in the next 2 to 3 seconds. At this time, polymerization is completed and the temperature begins to drop as the solid, molded object starts to cool.

When sufficiently cooled, the mold is opened and the object is removed.

There are other alternatives to the system described above. One alternate approach involves the introduction to a mixer of a stream composed of the monomers or a mixture thereof with other ingredients such as fillers, antioxidants, stabilizers, impact modifiers, and flame retardants. Also introduced to the mixer are at least two separate streams of catalyst and cocatalyst. Upon completion of mixing, the reactive mix is injected from the mixer into the preheated mold.

Generally speaking, once the reaction is initiated at mold temperature, it takes only 2 to 5 seconds for polymerization to take place. This, of course, depends on many variables such as the particular monomers and additives used, mold temperature, specific catalyst and cocatalyst system employed, etc. For purposes herein, the time in the mold should be less than about 5 minutes, preferably less than about 2 minutes. This is the time measured from the commencement of the filling of the mold to the time when the monomers are in a polymerized state and the object is ready for removal from the mold.

Due to the finite pot life upon combining the two monomer mixes, mix head 54 must be cleaned out every time the operation is shut down overnight or a prolonged period of time. Cleaning or flushing of the lines, valves, mix head, and the piston is accomplished with nitrogen gas stored under pressure in tank 22 and solvent stored in tank 62. For flushing with the nitrogen gas, valves 30 and 42 are set for recirculating the monomer mixes through the respective tanks. With valve 66 properly set nitrogen from tank 22 is conveyed through line 64 to mix head 54 via valve 66 and line 68 and then through line 56 and piston 58 and out to tank 70 via line 72. To clean the same lines, mix head, and piston with a solvent, line 64 is by-passed and nitrogen is applied to exert pressure on the solvent in tank 62 through line 74, valve 66 and then through the system in the same manner as in the flushing operation.

Reaction injection molding (RIM), a form of bulk polymerization, is a low pressure one-step or one-shot injection of liquid components into a closed mold where rapid polymerization occurs resulting in a molded plastic product. RIM differs from injection molding in a number of important respects. Injection molding is conducted at pressures of about 10,000 to 20,000 psi in the mold cavity by melting a solid resin and conveying it into a mold maintained at room temperature and the molten resin at about 150° to 350° C. At injection temperature of about 150° to 350° C., viscosity of the molten resin in an injection molding process is generally in the range of 50,000 to 1,000,000 and typically about 200,000 cps. In injection molding process, solidification of the resin occurs in about 10 to 90 seconds, depending on the size of the molded product, following which, the molded product is removed from the mold. There is no chemical reaction taking place in an injection molding process when the resin is introduced into a mold.

In a RIM process, viscosity of the materials fed to a mold is about 50 to 10,000 cps, preferably about 1500 cps, at injection temperatures varying from room temperature for urethanes to about 150° C. for lactams. Mold temperatures in a RIM process are in the range of about 100° to 200° C. and pressures in the mold are generally in the range of about 50 to 150 psi. At least one component in the RIM formulation is a monomer that is polymerized to a polymer in the mold. The main distinction between injection molding and RIM resides in the fact that in RIM, a chemical reaction takes place in the mold to transform a monomer to a polymeric state. For practical purposes, the chemical reaction must take place rapidly in less than about 2 minutes, in a preferred embodiment.

The invention described herein is illustrated by the following examples in terms of specific materials and operating conditions.

Example 1

The alkoxyalkylaluminum chloride cocatalyst solution was prepared by adding to 93.7 ml of methyltetracyclododecene (MTD) 4.7 ml of n-propanol followed by 6.3 ml of neat diethylaluminum chloride. An orange colored cocatalyst was produced of the following formula:

$(C_3H_7O)_{1\ 1/4}(C_2H_5)_{3/4}AlCl$

Example 2

This example demonstrates small scale bulk polymerization of methyltetracyclododecene (MTD) in bottles identified as A, B, C and D. The materials used in the experiments included Ethyl 330 antioxidant, a 0.5 molar solution of 1-propanol in MTD, a 0.5 molar solution of cocatalyst diethylaluminum chloride (DEAC) in MTD, and a 0.1 molar solution of catalyst tri(tridodecyl ammonium)molybdate (TTAM) in MTD. Initially, each bottle was fitted with a nitrogen line so that the polymerization reaction could be carried out under a blanket of nitrogen. To each bottle was added 1.2 g of the antioxidant and 80 ml or 80 g of MTD at room temperature. Since the antioxidant did not solubilize in MTD at room temperature, the contents of each bottle was heated to about 50° C. to dissolve the antioxidant in MTD and then cooled to room temperature.

To bottle A, containing the antioxidant and MTD, was added 3.0 ml of a 0.5 molar 1-propanol solution in MTD followed by 2.0 ml of a 0.5 molar DEAC cocatalyst solution in MTD. The time was 2:05 P.M. The reaction in situ between 1-propanol and DEAC produced the cocatalyst defined as propoxyethylaluminum chloride of the following formula:

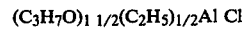

$(C_3H_7O)_{1\ 1/2}(C_2H_5)_{1/2}Al\ Cl$

At 2:44 P.M., 1.0 ml of a 0.1 molar, based on molybdenum, ammonium molybdate catalyst solution in MTD was added. The contents of the bottle was poured into a laboratory 2-plate mold maintained at 120° C. that was previously flushed with nitrogen. At 2:47 P.M., the mold was opened and a hard polymer object was removed.

With the antioxidant and MTD in bottle B, 3.0 ml of 0.5 molar 1-propanol solution in MTD was added followed by 2.0 ml of 0.5 molar DEAC cocatalyst solution in MTD. At 3:05 P.M., 1.0 ml of the 0.1 molar catalyst was added, the nitrogen line was removed from the bottle and vacuum was applied to de-gas the charge. At 3:07 P.M., vacuum was broken with nitrogen and the bottle contents were poured into the 2-plate mold maintained at 145° to 149° C. At 3:10 P.M., the mold was opened and the plastic object was removed. The temperature in the bottle varied from 145° to 151° C. during polymerization.

To bottle C was added 4.8 ml of the 1-propanol solution and 3.0 ml of the DEAC cocatalyst solution at 2:05

P.M. At 2:23 P.M., 3.8 ml of the catalyst was added and the sample was poured into a 120° C. mold. At 2:27 P.M., the mold was opened and a hard plastic plaque was removed containing bubbles and channels that formed as volatiles escaped during polymerization.

At 2:05 P.M., 4.8 ml of the 1-propanol solution and 3.0 ml of the DEAC cocatalyst solution were added to bottle D. At 3:24 P.M., 1.0 ml of the catalyst was added with application of vacuum. After degassing sample, vacuum was broken with nitrogen and the sample was poured into a 150° C. mold. On opening of the mold at 3:31 P.M., a plastic object was removed that was solid at room temperature and contained no bubbles or channels.

Example 3

This example demonstrates five molding runs using the system depicted in FIG. 2. In each run, the following materials were added to tanks 10 and 12:

|  | Tank 10 | Tank 12 |
|---|---|---|
| MTD, g. | 3000 | 3000 |
| Kraton G-1650, g. | 90 | 90 |
| TiO2 Filler, g | 150 | 150 |
| TTAM Catalyst, ml | 431 | — |
| Neon Red Pigment, g. | 30 | 30 |
| Ethyl 330 AO, g | 45 | 45 |
| DEAC, ml of 0.5 m | — | 334 |
| 1-Propanol, ml | — | 20.2 |

In the above table, MTD represents methyltetracyclododecene, Kraton G-1650 is a block copolymer of hydrogenated Styrene-Butadiene-Styrene used as an impact modifier, the TTAM Catalyst is tri(tridodecyl ammonium) molybdate and 431 ml thereof represents a 0.1 molar solution in MTD based on molybdenum, Ethyl 330 is a hindered phenol antioxidant, and DEAC is diethylaluminum chloride and 21.6 ml thereof was neat DEAC used as a solution thereof in 312.4 ml of MTD. The cocatalyst was prepared in tank 12 by the reaction between DEAC and 1-propanol in the presence of MTD and the additives.

Tanks 10 and 12 were maintained under full vacuum of about 23 to 25 psig. Run #1 was conducted at 120° C. mold temperature, Run #2 at 150° C., Run #3 at 100° C., and Run #4 at 120° C. In all cases, the mold was tilted the full 45° during filling thereof to reduce air entrapment, molding or polymerization taking place without nitrogen purge in 2 minutes of mold residence time. Mold residence time of less than 2 minutes can easily be achieved. Other variables for the four runs are given in Table I, below:

TABLE I

| Run # | Mold Temp. | Pump Strokes | Mold Rel. Agent |
|---|---|---|---|
| 1 | 120° C. | 8 | yes |
| 2 | 150° C. | 5 | no |
| 3 | 100° C. | 5 | yes |
| 4 | 120° C. | 5 | no |

The pumps employed were piston pumps requiring about 5 shots to fill the mold. Since the lines were empty when the experiments described herein were undertaken, the first run needed 8 shots of the piston to fill the mold and the lines.

The product in each instance was a hard plastic tray that was smooth and opaque white. The tray measured 8"×16", had a depth of 1", bottom thickness of $\frac{1}{8}$" and side thickness of $\frac{1}{4}$".

We claim:

1. A process comprising the steps of conveying a reactive liquid mix into a mold maintained at an elevated temperature whereby ring opening polymerization in bulk of said liquid mix is thermally initiated, and extracting a molded product from the mold; said liquid mix comprising an organoammonium catalyst selected from organoammonium molybdates and organoammonium tungstates, an alkoxyalkylaluminum halide or aryloxyalkylaluminum halide cocatalyst, and at least one norbornene-type monomer.

2. Process of claim 1 wherein said norbornene-type monomer is selected from the following monomers, and mixtures thereof:

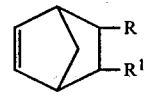 

where R and $R^1$ are independently selected from hydrogen, alkyl, and aryl groups of 1 to 20 carbon atoms, and saturated and unsaturated cyclic groups containing 3 to 12 carbon atoms formed by R and $R^1$ and the two ring carbon atoms connected thereto; amount of said catalyst being 0.01 to 50 millimoles molybdenum or tungsten per mole of total norbornene-type monomer and the molar ratio of said cocatalyst as aluminum to said catalyst as molybdenum or tungsten is in the range of about 200:1 to 1:10.

3. Process of claim 2 wherein R and $R^1$ of said norbornene-type monomer are independently selected from hydrogen and alkyl groups of 1 to 2 carbon atoms; wherein said liquid mix has a pot life of at least about one hour at room temperature and is polymerized in less than 5 minutes after being thermally initiated; and wherein said catalyst is defined by the following formulas I and II:

$$[R_4N]_{(2y-6x)}M_xO_y \text{ (I)} \quad [R^1_3NH]_{(2y-6x)}M_xO_y \text{ (II)}$$

where each R and $R^1$ group is independently selected from hydrogen, alkyl, and alkylene groups each containing 1 to 20 carbon atoms, and cycloaliphatic groups each containing 5 to 16 carbon atoms, the sum of all carbon atoms represented by said R groups is 20 to 72 and the sum of all carbon atoms represented by said $R^1$ groups is 15 to 54; M is selected from molybdenum (VI) and tungsten (VI): and x and y represent the number of M and O atoms in the molecule.

4. Process of claim 3 wherein said cocatalyst is defined by the formula $$(RO)_aR'_bAlX_c$$

where R is selected from alkyl and aryl groups containing 1 to 18 carbon atoms, R' is an alkyl group of 1 to 18 carbon atoms, X is a halogen, and (a), (b) and (c) represent equivalents of RO, R' and X, respectively, where (a) is about $\frac{1}{2}$ to $2\frac{1}{2}$, (b) is about $\frac{1}{4}$ to 2, and (c) is about $\frac{1}{2}$ to 2.

5. Process of claim 3 wherein in reference to said cocatalyst the R group is an alkyl group of 2 to 4 carbon atoms and the $R^1$ group also contains 2 to 4 carbon atoms; said liquid mix is heated in the mold to a temperature above 50° C.

6. Process of claim 4 wherein said norbornene-type monomer is selected from substituted and unsubstituted 2-norbornenes, dicyclopentadienes, dihydrodicyclopentadienes, trimers of cyclopentadienes, tetracyclodoecenes, and mixtures thereof; and said liquid mix has a pot life of about 1 to 8 hours at room temperature and is polymerized in the mold at a mold temperature in the range of 60° to 200° C.

7. Process of claim 5 wherein said norbornene-type monomer is selected from norbornene, methylnorbornene, tetracyclododecene, methyltetracyclododecene, dicyclopentadiene, tricyclopentadiene, and mixtures thereof; pot life at room temperature of said liquid mix being about 1 hour to 8 hours and said liquid mix is polymerized in less than 2 minutes in a mold at a mold temperature in the range of 60° to 200° C.

8. Process of claim 2 including the steps of preparing said liquid mix from two monomer mixtures, one mixture containing said monomer and said catalyst and the second mixture containing said monomer and said cocatalyst, by mixing the two monomer mixtures in a predetermined proportion at a temperature at which polymerization reaction is essentially dormant for a period of at least one-half minute, conveying the resulting reactive liquid mix to a mold maintained at an elevated temperature at which polymerization is thermally initiated; and extracting a molded product from the mold.

9. Process of claim 5 wherein said catalyst is selected from tridodecylammonium, methyltricaprylammonium, tri(tridecylammonium) and trioctylammonium molybdates and tungstates; and (a), (b) and (c) of said cocatalyst are defined by the area ABCD in the plot of FIG. 1.

10. Process of claim 9 wherein said polymerization is conducted under a blanket of nitrogen, and said halide in said cocatalyst is selected from chlorine, bromine and iodine.

11. Product produced by the process of claim 1.

12. Product produced by the process of claim 10.

* * * * *